United States Patent [19]

Ewing et al.

[11] 4,288,394

[45] Sep. 8, 1981

[54] SEWAGE AERATION SYSTEM

[75] Inventors: Lloyd Ewing, Bayside; David T. Redmon, Racine; Paul M. Thayer, Milwaukee; Frank L. Schmit, Port Washington; William H. Roche, Mequon, all of Wis.

[73] Assignee: Water Pollution Control Corp., Milwaukee, Wis.

[21] Appl. No.: 102,175

[22] Filed: Dec. 10, 1979

Related U.S. Application Data

[63] Continuation-in-part of Ser. No. 952,891, Oct. 19, 1978, abandoned.

[51] Int. Cl.³ .............................................. B01F 3/04
[52] U.S. Cl. .................................... 261/122; 137/852; 210/220; 239/145; 261/124
[58] Field of Search ............... 261/122, 124, 62, 64 B; 210/220; 239/145; 137/852

[56] References Cited

U.S. PATENT DOCUMENTS

| | | | |
|---|---|---|---|
| 2,346,367 | 4/1944 | Durdin | 261/122 |
| 3,083,953 | 4/1963 | Langdon et al. | 261/122 |
| 3,396,950 | 8/1968 | Wood | 261/124 X |
| 3,525,436 | 8/1970 | Reckers | 261/124 X |
| 3,532,272 | 10/1970 | Branton | 261/122 X |
| 3,733,064 | 5/1973 | Branton | 261/124 X |
| 3,768,788 | 10/1973 | Candel | 261/124 X |
| 3,953,553 | 4/1976 | Thayer | 261/122 |
| 3,970,731 | 7/1976 | Oksman | 261/122 |
| 4,007,240 | 2/1977 | Gosden | 210/220 X |
| 4,046,845 | 9/1977 | Veeder | 261/122 |

Primary Examiner—Richard L. Chiesa
Attorney, Agent, or Firm—Pollock, Vande Sande & Priddy

[57] ABSTRACT

A sewage aeration system comprising a header pipe, plenums of synthetic thermoplastic or thermoset resin with side walls inclined upwardly and outwardly to diffusion element support means, generally horizontal diffusion elements free of through-holes other than air diffusion pores, retaining means securing the elements about their peripheries to the plenums, sealing means adjacent the peripheries of the diffusion elements and airflow regulator members which terminate in the plenums beneath the horizontal diffusion elements.

48 Claims, 22 Drawing Figures

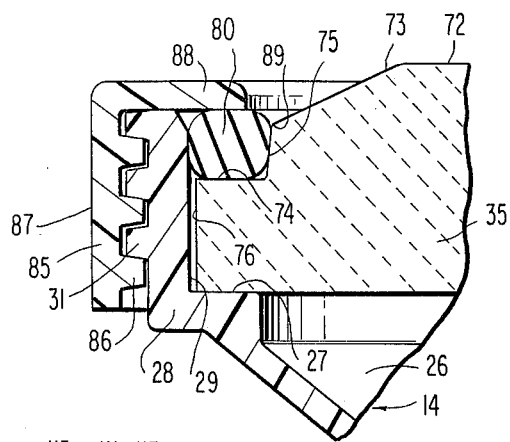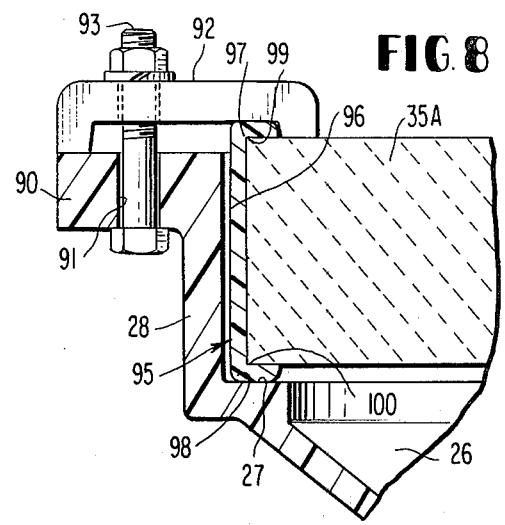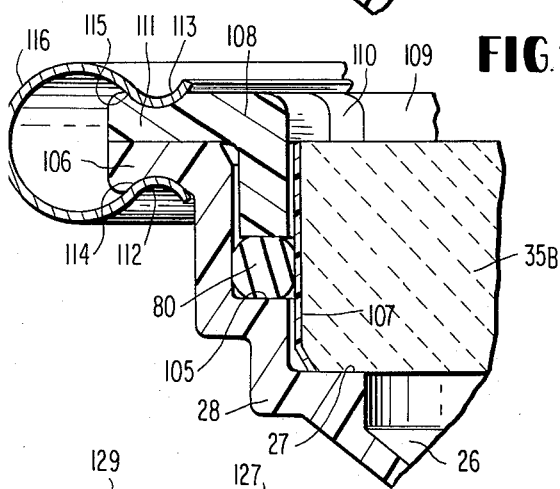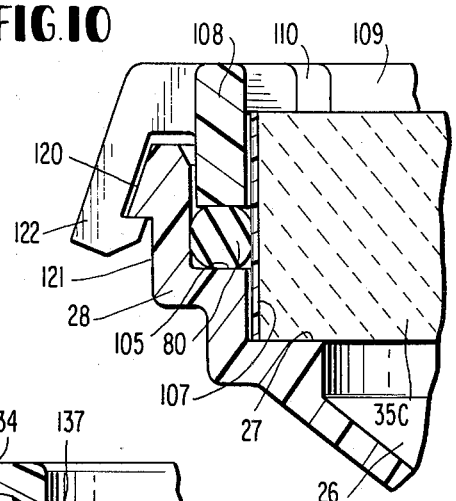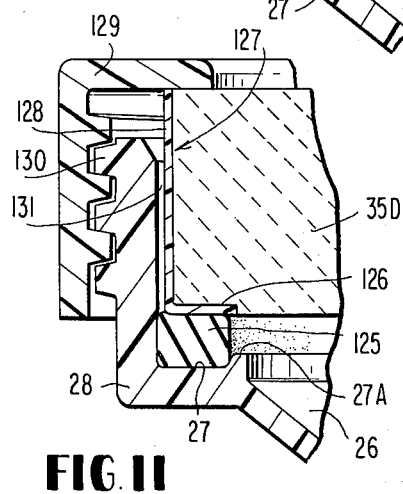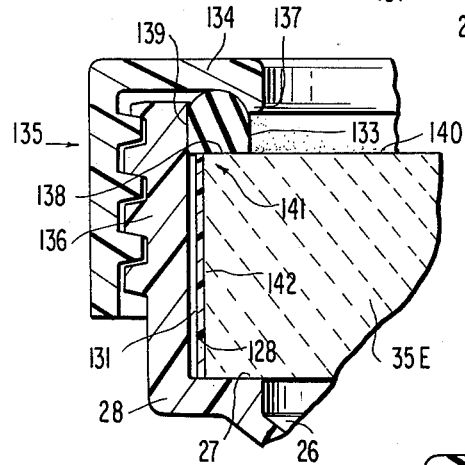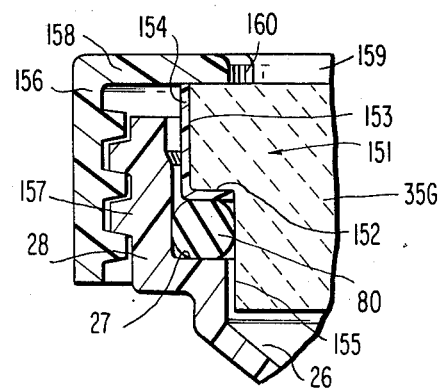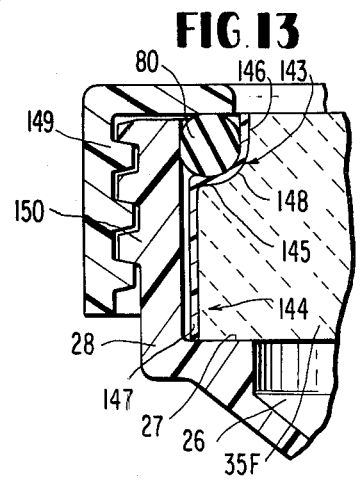

SEWAGE AERATION SYSTEM

This application is a continuation-in-part application based on application Ser. No. 952,891 filed Oct. 19, 1978, now abandoned.

BACKGROUND OF THE INVENTION

Heretofore a variety of designs have been proposed for sewage aeration systems comprising a header pipe, a holder, a porous diffusion element, means for retaining the diffusion element in the holder, sealing means and air flow regulator means. Examples may be found for instance in U.S. Pat. Nos. 2,346,367, 3,083,953, 3,532,272, 3,733,064, 3,970,731 and 4,007,240.

Experience with commercially available sewage aeration systems of the above mentioned type, as well as careful study and experimentation, have shown that such systems suffer from one or more shortcomings alone or in combination. Among these are tendencies to produce excessive quantities of large bubbles, with resultant impairment of oxygen transfer efficiency; expense and complexity of system components; complexity and labor costs associated with field installation; a certain tendency to cause breakage of diffusion elements during installation; lack of uniformity of distribution among diffusion elements; lack of uniformity in the distribution of air flow across individual diffusion elements; and other difficulties. The purpose of the present invention is to reduce or eliminate these difficulties and provide an improved sewage aeration system.

SUMMARY OF THE INVENTION

The improved sewage aeration system of the present invention includes a header pipe having air outlet openings therein at spaced points along its length. The invention pertains to that type of system having plenums of synthetic thermoplastic or thermoset resin which include side wall means. In common with some prior art systems, portions of the plenums conform to the outer surfaces of the header pipe. The plenums are held in close fitting engagement with a substantial portion of the length of the header pipe outer surface and with the transverse cross section of said pipe through a substantial arc. The side wall means include diffusion element supporting means spaced upwardly from the header pipe on the side wall means. However, by way of contrast, the present invention provides a combination of the foregoing means with diffusion elements, retaining means, and air flow regulator members having certain specified spatial relationships. The diffusion elements are generally horizontal, having air diffusion pores extending therethrough and are free of through-holes other than said air diffusion pores. There are retaining means which engage the diffusion elements for securing the elements to the plenums, but the retaining means engage the diffusion elements about their peripheries. There are air flow regulator members in communication and connected with at least one opening in the header pipe, but the air flow regulator members terminate beneath the diffusion elements and are not used to retain the diffusion elements in place.

The invention includes the system as described above plus certain additional features which may be used singly or in groups in combination with the foregoing. For example, one may use diffusion elements which have a bubble release pressure characteristic in the range of about 2 to about 20 inches of water gauge. One may employ a combination wherein the diffusion elements have vertical edges which are porous, permeable and free of adherent material preventing bubble emission and in which the vertical edges are covered by the combined structures of the plenums, sealing means and retaining means. In a particularly preferred embodiment the sealing means are located at or above common edges between vertical peripheral surfaces and upwardly facing upper surfaces of the diffusion elements, so as to prevent discharge of bubbles from below said edges. A particularly preferred embodiment includes plenums having threaded outer walls positioned opposite generally upright edges of the elements and having threads thereon to engage corresponding threads on the retaining means. According to another alternative but preferred feature, all portions of the elements which emit air to water have ready access to replacement water to maintain surface tension. Moreover the elements may and preferably do have enhanced apparent volumetric compression ratio in central or boundary zones thereof. These and other alternative features of the invention may be discerned from the accompanying drawings and description of preferred embodiments.

BRIEF DESCRIPTION OF THE DRAWINGS

FIG. 7 is an enlarged portion of FIG. 3 showing the peripheral edge of the diffusion element in transverse cross section, along with portions of the plenum, retaining means and sealing means.

FIGS. 8 to 14 show the same portion of the apparatus as FIG. 7, but with varying modifications to the diffusion element retaining means and sealing means.

DESCRIPTION OF PREFERRED AND VARIOUS OTHER EMBODIMENTS

The above mentioned figures and the following text describe preferred embodiments of the invention and various others which may be used. It should however be understood that the various embodiments disclosed herein are given only by way of example and that the invention may be embodied in many forms other than those actually disclosed herein.

Figure 1:
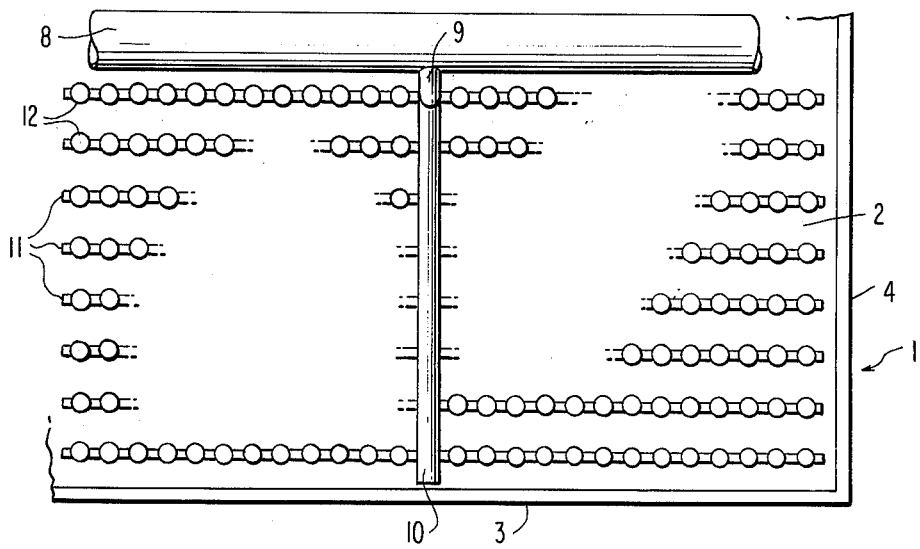
FIG. 1 is a fragmentary view of a sewage aeration tank comprising air supply main, downcomer pipe, distribution pipes, header pipes and diffusers.

For example, FIG. 1 discloses one of many possible arrangements of the air distribution piping of a sewage aeration system. In FIG. 1, sewage aeration tank 1 includes bottom 2 with side and end walls 3 and 4 to contain a body of sewage which is to be aerated. Compressors (not shown) feed air to an air main 8 which generally is supported above the level of liquid in the tank, and which feeds into a downcomer pipe 9 extending vertically from air main 8 to a horizontally disposed distributor pipe 10 supported substantially horizontally a short distance above bottom 2. Parallel rows of air header pipes 11, also supported horizontally a short distance above bottom 2, are fed by distributor pipe 10. The spacing, in a horizontal plane, of air headers 11 and diffusers 12 is determined on the basis of criteria known to persons skilled in the art.

Figure 2:
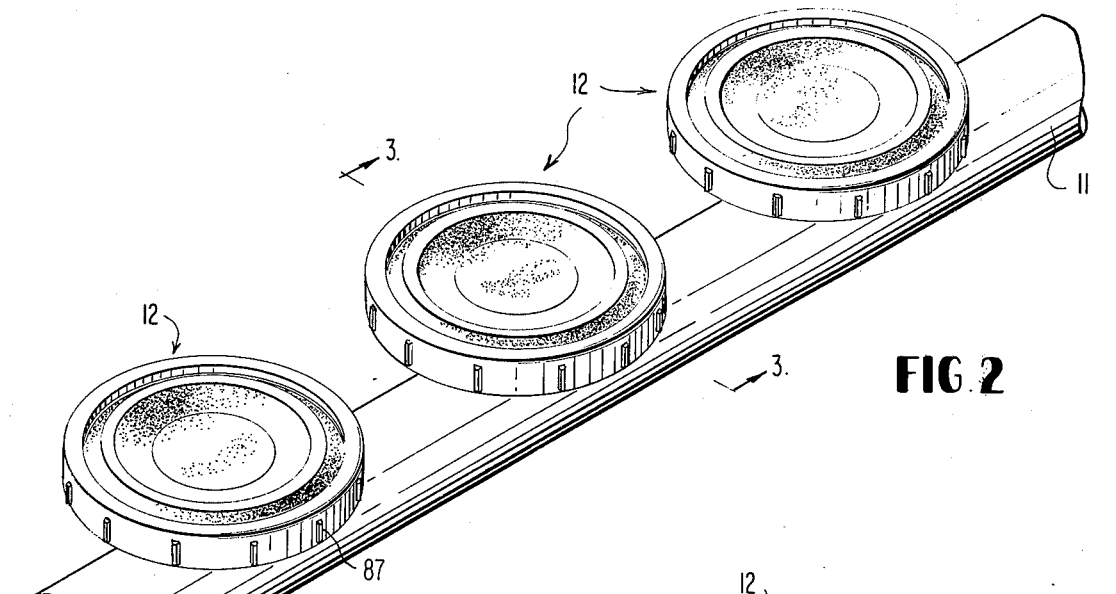
FIG. 2 is a perspective view of a section of header pipe and diffusers of FIG. 1.

FIG. 2 shows in perspective a broken out and enlarged portion of one of the air headers 11 with its diffusers 12. Header pipes of any material may be used, including for instance, metallic, resin-lined metallic, and rigid resin pipe, including reinforced or unreinforced thermoplastic and thermoset resin pipe. If one chooses a pipe having a load bearing wall of polymeric material, which is preferred, it should have a tensile strength of about 2000 to about 60,000 psi, a flexural modulus of about $4 \times 10^4$ to about $4 \times 10^6$ psi and a stiffness of about 10 to about 1000 psi, by ASTM D-2412. Whatever pipe is used, the pipe material is chosen with due regard to its resistance to corrosion, weather, collapse and impact. Suitable provision (not shown) should be made for expansion and contraction where necessary.

The plenum is of polymeric material, may be reinforced and preferably has the physical properties described above in connection with the preferred pipe. The plenum may be fashioned by any appropriate forming process, such as for instance, injection molding, lay up and spray up techniques.

Figure 3:
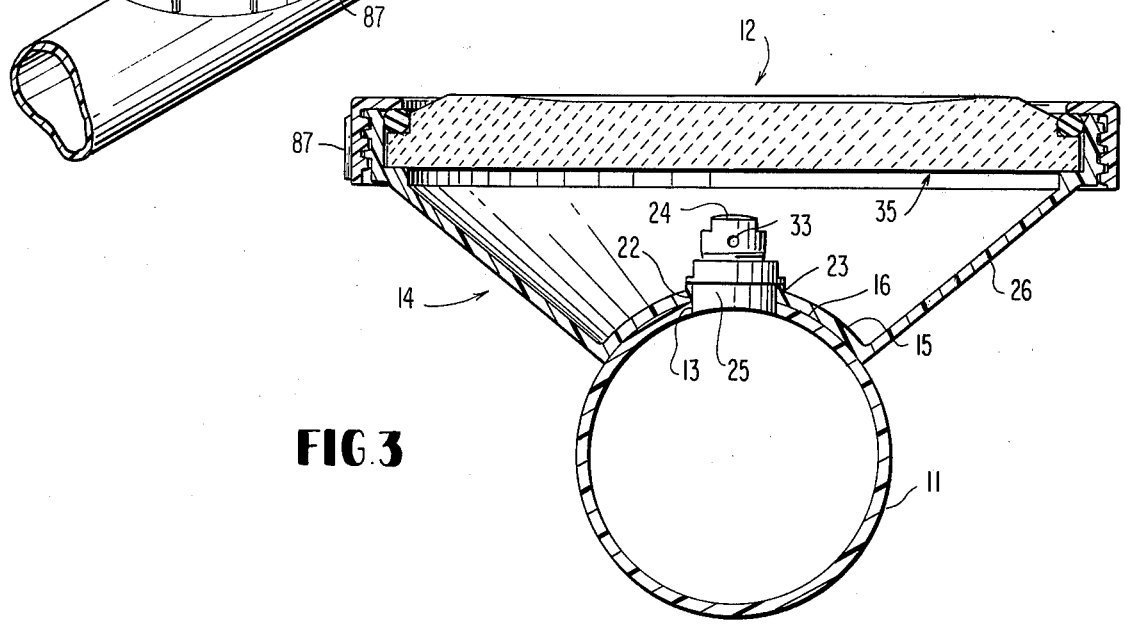
FIG. 3 is a vertical transverse cross section of the header pipe and one of the diffusers of FIG. 2 taken on section line 3—3 of FIG. 2.
Figure 4:
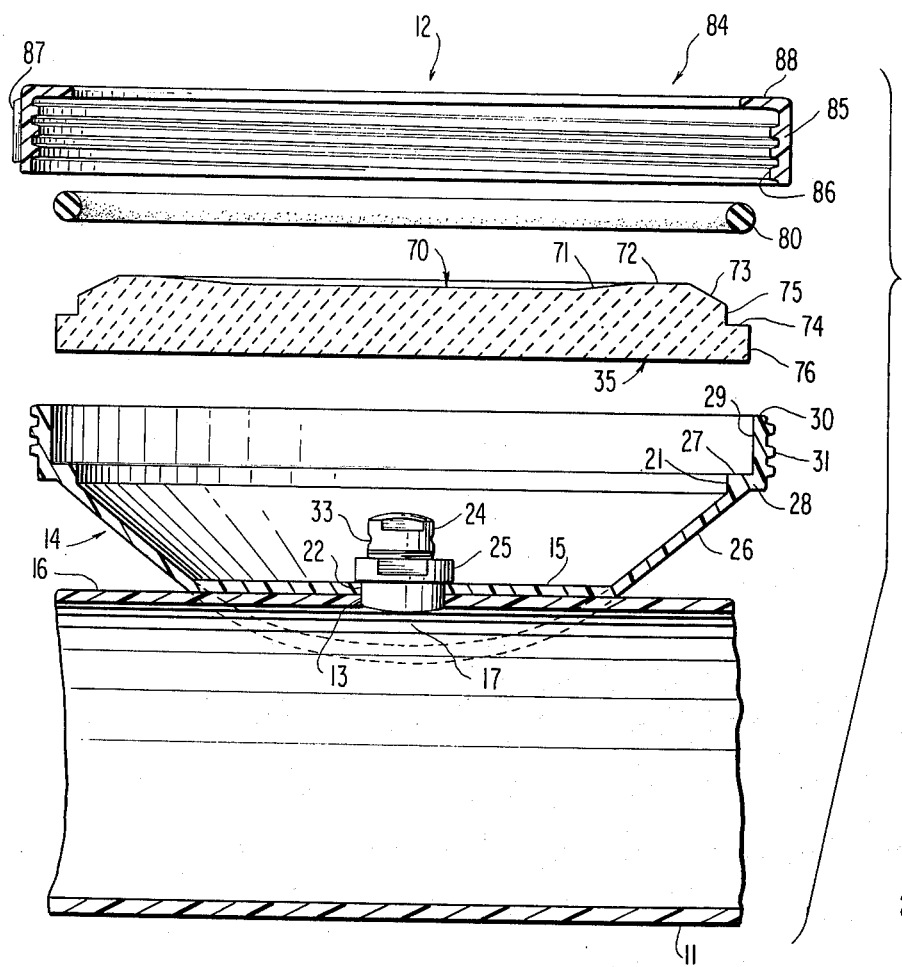
FIG. 4 is a longitudinal cross section of the diffuser and pipe of FIG. 3, the component parts of the diffuser being exploded for clarity.

As shown in FIGS. 3 and 4, header pipe 11 has air outlet openings formed at longitudinally spaced intervals along its top center line to feed air into the respective plenums 14 of diffusers 12. Each plenum 14 includes lower wall means 15. All or at least a substantial portion of the lower wall means is circular in transverse cross section and conforms to the outer surface 16 of pipe 11. Lower wall 15 may be held in close fitting engagement with pipe 11 in a variety of ways, including various mechanical arrangements, such as clamps or straps but preferably by bonding to the pipe. In general any bonding technique may be employed, such as for instance, adhesive bonding; but if the pipe is of polymeric material, which is preferred, the attachment may also be made by solvent or thermal (including sonic) welding. The latter is of considerable advantage in terms of ease and economy of construction. Depending on the type of attachment means employed, the plenum may be sealed to the pipe by the same means used in attachment, or by different means. Thus one may provide an elastomeric seal between the plenum lower wall means and pipe outer surface 16, or the seal may be provided by the welding or adhesive referred to above.

From the standpoint of structural integrity, especially when using both polymeric pipe and a plenum of polymeric material, it is beneficial that lower wall means 15 be held in close fitting engagement with a substantial portion of the length of the pipe outer surface 16 (as shown in FIG. 4) and of the transverse cross section of the pipe. Preferably, lower wall 15 conforms and engages with the transverse cross section of the pipe through an arc of at least about 20°, more preferably about 45 or more degrees and most preferably about 70 or more degrees, at least in the mid portion 17 (FIG. 4) of the lower wall means. In the illustrative and preferred embodiment shown in FIGS. 3 and 4 the arc is about 90°.

As shown in FIGS. 3 and 4, lower wall means 15 includes an air inlet opening 22, around which there may be provided a small upstanding boss 23 (FIG. 3) on the inner surface of plenum lower wall means 15. Air outlet opening 13 and air inlet opening 22 are maintained in registry with one another.

According to the invention, the system is provided with an air flow regulator member, one possible example of which is indicated by reference numeral 24. According to a preferred embodiment of a combined bonded assembly is formed by the pipe, by lower wall means 15 and by the air flow regulator member or a sleeve member 25 in which the air flow regulator member is mounted. Thus, for instance, all of these parts may be simultaneously adhesively bonded or welded, with considerable savings in manufacturing steps and costs. The air flow regulator member 24 and various embodiments thereof will be discussed in greater detail below. The lower wall means 15 may be of any desired shape as viewed in horizontal plan view. It may for instance have a square, rectangular, circular or oval outline, the latter being preferred. Air inlet opening 22 and regulator 24 are both preferably within this outline as viewed in plan view.

Figure 15:
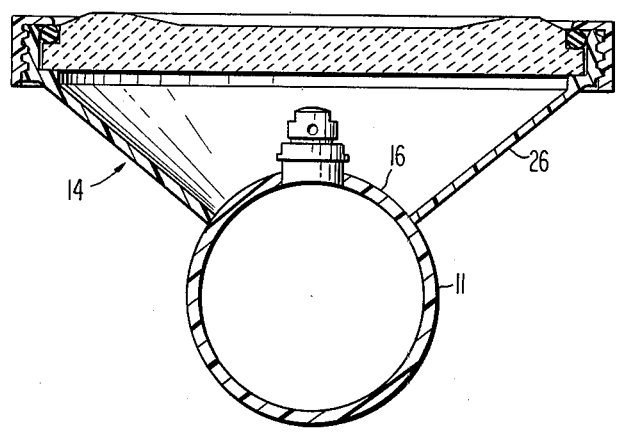
FIG. 15 is a vertical transverse cross section of the header pipe and one of the diffusers of FIG. 2 wherein the plenum side walls are affixed directly to the pipe wall, whereby the upper surface of the header pipe serves as the bottom wall of the plenum.

As shown in FIG. 15 the sidewalls of the plenum may be attached directly to the upper surface of the header pipe. This upper surface then functions as the bottom wall of the plenum.

A wide variety of gas flow regulator means may be employed in the invention, including those with varying pressure response characteristics. For instance, one may employ regulators which respond exponentially to changes in pressure, such as for instance fixed orifices, or those which respond in a more linear fashion, such as for instance passages with large ratios of length to cross sectional area. Passages which change their cross-section in response to pressure changes are also contemplated, including those which can perform a valving function and those which are capable only of uni-directional flow. Examples appear in FIGS. 3, 4, 5 and 5A-5D.

Figure 5:
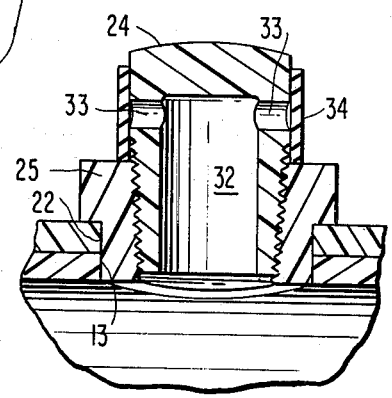
FIG. 5 is an enlarged portion of FIG. 4 showing portions of the wall of the header pipe and the lower wall of the plenum, along with the details of the air flow regulator member which is in communication and connected with the air outlet and inlet openings in said pipe and lower wall. This figure also shows an optional lower valve member on the air flow regulator member.
Figure 6:
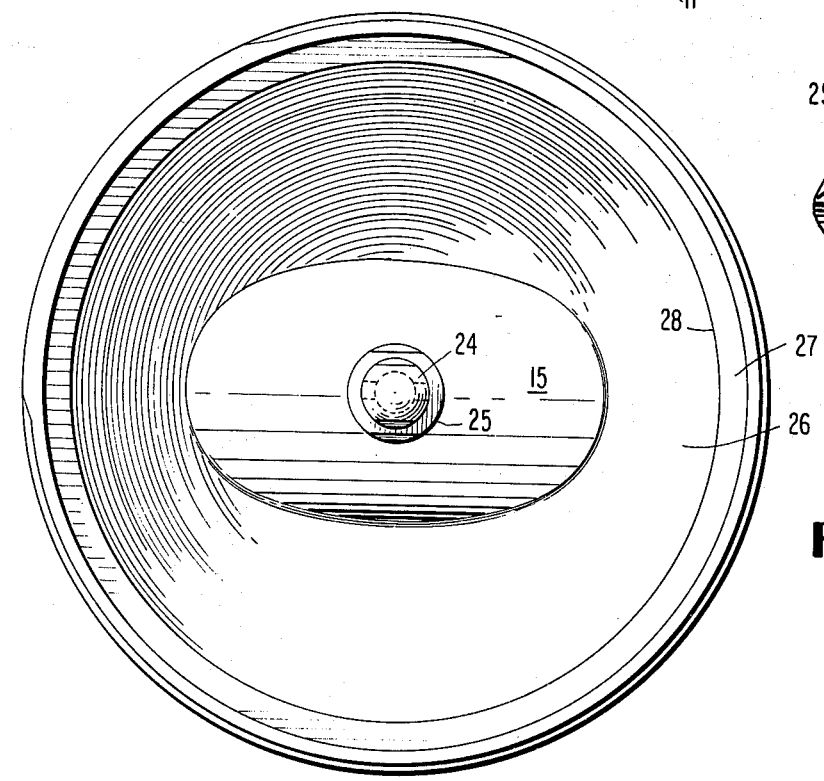
FIG. 6 is a plan view of the plenum of FIG. 4.

FIG. 5 shows the regulator 24 of FIGS. 3 and 4 enlarged and in longitudinal cross section. In this embodiment the regulator is a plug member having a central void to communicate through the open bottom of sleeve 25 with the interior of pipe 11. Extending laterally from recess 32 are a pair of horizontal orifices 33 communicating with the interior of plenum 14. As shown in FIGS. 3 and 4 these orifices 33 are in direct open communication with the interior of plenum 14. However, if the outer ends of orifices 33 are covered by an elastic band 34 as shown in FIG. 5, the orifices have a uni-directional flow characteristic, i.e. they function as check valves. Such characteristic is valuable if there is a temporary loss of air pressure in header pipe 11. The uni-directional flow characteristic of the regulator tends to maintain pressure within plenum 14, thus discouraging backflow of liquid from the exterior of the diffuser through the diffusion element 35 into the plenum. This reduces the difficulties of starting up the system when pressure is restored. Backflow of sewage-laden water through diffusion element 35 or regulator 24 tends to plug these components, leading to possible complete plugging or non-uniform distribution of air flow through the element and/or system when the flow of air under pressure is restored.

Figure 5A:
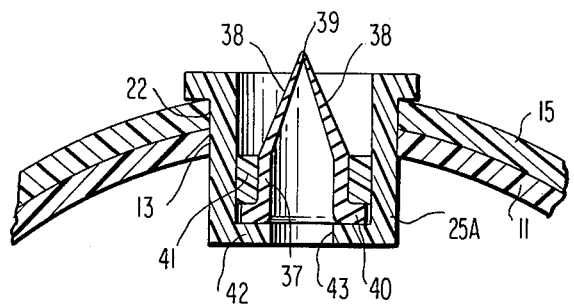
FIGS. 5A–5D show the same portions of the header pipe and plenum walls as FIG. 5 with alternate forms of air flow regulator members which may be substituted for those shown in FIGS. 4 and 5.

FIG. 5A discloses a pressure responsive uni-directional flow regulator commonly referred to as a "duckbill". The duckbill is normally made of flexible and elastic material in a lip-like configuration reminiscent of a duck's bill and having lips terminating in a slit which is normally closed. In this embodiment the duckbill is mounted in a sleeve 25A recessed in the plenum lower wall 15 and header pipe 11, so that the duckbill may be mainly within the outline of the header pipe. The duckbill has a cylindrical barrel portion 37, lips 38 terminating in a horizontal slit 39 and an annular flange portion 40 which is confined in sleeve 25A by a concentric collar 41 fixed within sleeve 25A. An inwardly directed flange 42 with central opening 43 at the lower end of sleeve 25A supports the duckbill from beneath and provides communication with the interior of cylindrical barrel 37, by means of which air is communicated from the interior of the pipe between lips 38 and through slit 39 into the interior of plenum 14. The orifice provided upon opening of slit 39 varies in accordance with the pressure, but closes on termination of inward flow relative to the plenum. Thus, like the modification illustrated in FIG. 5, this regulator acts as a check valve.

Figure 5B:
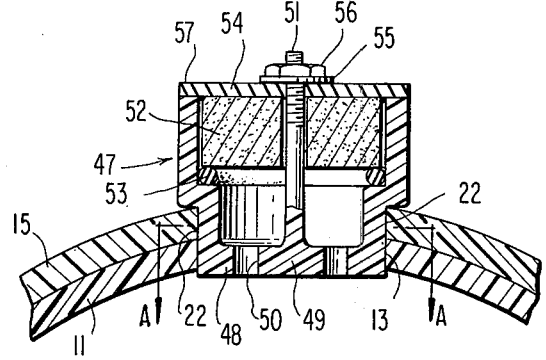
Figure 5D:
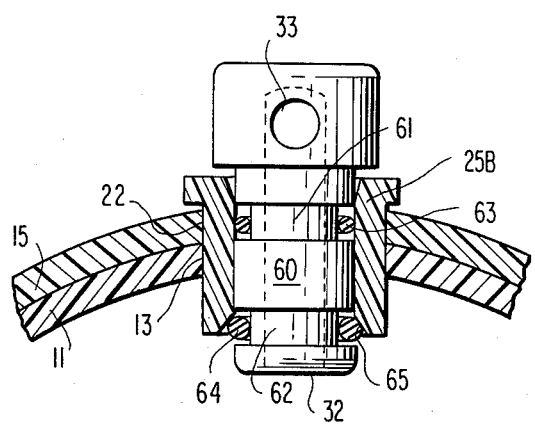
Figure 5C:
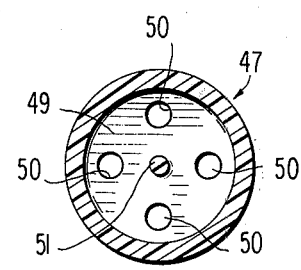

FIGS. 5B and 5C illustrate a flow regulator comprising a plurality of passages having a large ratio of length to cross sectional area. The regulator of FIG. 5B, shown in partial section, includes a stepped cylindrical housing 47 of which lower end 48, having a reduced cross section, closely fits within the air outlet and inlet openings 13 and 22 of header pipe 11 and plenum lower wall 15, which components may if desired be welded into a unitary assembly. Housing 47 includes a circular lower base 49 with air inlet holes 50 more clearly shown in FIG. 5C, and serves as the base for a central threaded post 51 which extends above the top of housing 47. In the upper larger diameter portion of housing 47, is an annular porous plug 52 which substantially fills the space between post 51 and the side walls of housing 47. Bypassing of air flow between the outer periphery of plug 52 and the internal walls of housing 47 is prevented by an O-ring seal 53 adjacent the plug and compressed between the plug and the step in housing 47. Bypassing of air through the center hole in plug 52 between the plug and post 51 is prevented by a flexible sealing flap 54 held in sealing engagement with the center portion of the upper surface of the plug by washer 55 and nut 56 threaded on post 51. The flexibility of flap 54 permits its outer edge to rise when air passes from the interior of header pipe 11, through porous plug 52 to its upper surface. Thus air emitted from the upper surface of the porous plug may pass between the upper edge of housing 47 and the flap edge 57 which acts as a uni-directional valve. On termination of upward flow through porous plug 52, or upon the commencement of flow in the opposite direction the flap closes preventing reverse flow of gas back towards header pipe 11.

Like FIGS. 3, 4 and 5, FIG. 5D illustrates a readily removable and replaceable flow regulator. In this embodiment, the regulator is partly within plenum 14 and partly within pipe 11. A sleeve 25B is positioned in air outlet and inlet holes 13 and 22 of header pipe 11 and plenum lower wall 15. Like the regulator of FIGS. 3, 4 and 5, the regulator in FIG. 5D includes a cylindrical void or recess 32 open at the bottom and, in communication therewith, a horizontal orifice 33. The cylindrical barrel portion 60 of this regulator closely fits within the cylindrical bore of sleeve 25B and has two annular grooves, upper and lower grooves 61 and 62 respectively, in which upper and lower O-rings 63 and 64 are mounted. Upper O-ring seal 63 is of slightly larger outer diameter than the inner diameter of sleeve 25B, and effectively seals off flow from header pipe 11 to the interior of plenum 14 through the space between cylindrical barrel 60 and the inner surface of sleeve 25B. Lower O-ring 64 has a somewhat larger external diameter which enables it to act as a catch to hold the flow-regulator in place. O-ring 64 is sufficiently compressible and has sufficient space in groove 62 so that cylindrical barrel portion 60, with O-ring 64 in place in groove 62, may be introduced into the upper end of sleeve 25B and forced through sleeve 25B to the position shown in FIG. 5D, at which point O-ring 64 expands against the tapered lower inner surface 65 which forms a detent at the lower end of sleeve 25B. O-ring 64 has sufficient exterior diameter to hold the regulator member in place under normal operating pressure, but the regulator may be withdrawn without destroying the regulator or the sleeve 25B, and may be replaced with a regulator of differing flow characteristics. This is beneficial when it becomes necessary to replace diffusion element 35 (FIGS. 3 and 4) with elements having different head loss characteristics, or in the event it is desired to alter the overall operating characteristics of the aeration system.

The foregoing FIGS. 3, 4, 5, and 5A-5D disclose but a few of the possible alternative forms of regulators which may be mounted within the transverse cross-sectional area of the plenum, of the header pipe or of both of them. However, the various flow regulator devices depicted herein have the common characteristic that each of them is included in a member which terminates beneath the diffusion element 35. Persons skilled in the art will readily furnish a variety of alternative regulator devices, mounted in various fashions, which correspond with the foregoing.

As shown in FIGS. 3 and 4, side wall means 26 is connected with the periphery of lower wall means 15. The side wall may be vertical, or inclined inwardly or outwardly from the lower wall means. Preferably, the side wall means is connected with the entire periphery of the lower wall means, and is inclined upwardly and outwardly from the lower wall means. Diffusion element supporting means, spaced upwardly and outwardly from the lower wall means, are provided on said side wall means. Such supporting means may for instance include a horizontal annular shelf 27 with inner and outer diameters respectively smaller and larger than the diameter of the lower edge of the diffusion element 35, to be described in greater detail below. Shelf 27 may, if desired, be part of a step in side wall means 26, the rising portion of which step comprises a cylindrical generally upright wall 21. The diffusion element supporting means may be in any desired position on side wall means 26, but is preferably at (in, on or near) the extreme upward and outward projection of wall means 26. Preferably also wall means 26 is of a conical shape.

According to one of the preferred alternative forms of the invention, disclosed in FIGS. 3-4, the plenum includes an integral generally upstanding wall 28 which, when viewed in plan view, surrounds the diffusion element supporting means, e.g. annular horizontal shelf 27. When provided, which is preferred, upstanding wall 28 has a height which is about equal to the height of the diffusion element 35. Thus, according to this preferred alternative, the height of wall 28 may be equal to or slightly greater or less than the height of the diffusion element. Wall 28 has an inner surface 29, also generally upstanding, an upper edge 30 and threaded outer surface 31. The shelf 27 and generally upstanding wall 28 therefore can, in the preferred embodiment, provide a socket to receive diffusion element 35, in which substantially the entire height of diffusion element 35 is recessed as shown in FIG. 3 and in the enlargement in FIG. 7.

Irrespective of the particular form of support arrangement adopted, it is preferred that the diffusion element be so supported that all portions thereof which emit air to the surrounding liquid may have ready access to replacement water, to maintain such emitting portions in contact with water and subject to the influence of surface tension. Thus, it is preferred to avoid a situation in which a side surface of the element is adjacent to a crevice which can be swept clear and kept clear of water by the air discharged from the side surface. The air emanating from the element adjacent said crevice does not have to overcome the effects of surface tension, causing air to be preferentially routed to that portion of the element and thus correspondingly impairing the uniformity of distribution of flow from the element. However, if the supporting means and other associated structure are so shaped and positioned that any exposed portion of the element capable of emitting air to the liquid has ready access to replacement liquid, so that the surface is not swept and kept clear of water, the aforementioned distribution difficulty can be avoided. Alternatively, a portion of the diffusion element which would otherwise discharge air into a crevice of the type described above can be sealed by appropriately positioning a seal of lesser height than the element, by applying an impermeable coating to the surface, or by sufficiently compressing such sides or any portion thereof having access to water so as to render same substantially impermeable. However, the preferred diffusion elements include sides which are porous, at least semi-permeable, free of adherent material preventing bubble emission and "vertical" (including near vertical, e.g. within about 20° of vertical). Still more preferably such vertical or near vertical edges are covered by the combined structure of the plenum, sealing means and retaining means. According to a particularly preferred embodiment, described in greater detail below, the sealing means is of lesser height than the diffusion element, but is positioned at an upper edge defined by the intersection of said vertical or near vertical sides and an upward facing portion of the upper gas discharge surface of the element.

A wide variety of diffusion elements may be employed, made of varying materials in varying configurations. The elements may, for instance, be formed of organic or inorganic materials in particulate and/or fibrous forms. An exemplary organic material is particles of fusible polymeric material as disclosed in U.S. Pat. No. 3,970,731. Exemplary of inorganic materials are metal and ceramic powders, including for example, alumina, silica, mullite, and various clays. The finely divided materials are generally shaped and compacted under pressure, and, if necessary, heated or fired to fully develop the necessary coherency. Bonding with organic or inorganic binders is contemplated, and the finely divided particles and/or fibers may be bound together by organic adhesive bonds, ceramic or fusion bonding or sintering.

Among the applicable shapes are those which appear round, oval, square, rectangular, polygonal and irregular in plan view, and those which appear substantially horizontal in transverse cross section, including those which are truly flat and those which are only generally horizontal, in the sense of including non-planar surfaces but extending in a generally horizontal direction from one edge to the other. The elements may have plain vertical or inclined edges, with or without steps and the edge portions may include bevels, rounded portions, grooves and the like.

In general the applicable elements preferably have active gas discharge surfaces which are free of bubble emitting macro openings, such as those shown for instance in U.S. Pat. No. 3,970,731 to Oksmann. A macro hole is an intentionally or unintentionally produced hole larger than that normally produced by compaction of the particulate material. Preferably the element is such that it will emit fine bubbles from random locations throughout the gas discharge surface. Preferably the gas infusion surface of the element is free of air transmitting macro holes longer than 0.3T wherein T is the average thickness of the element weighted on an area basis, or is free of such holes. A macro hole is an intentionally or unintentionally produced hole larger than that normally produced by compaction of the particulate material. It is beneficial if substantially all gas paths through the body of the element to its gas discharge surface, as installed in the plenum or other holder, are about the same length. Moreover, it is preferred to employ a diffusion element having a bubble release pressure in the range of about 2 to about 20, preferably about 3 to about 15 and more preferably about 4 to about 10 inches of water gauge. The optimum bubble release pressure is considered to be about 7 inches. The values given are for bubble release pressure in water of new elements as manufactured, i.e. prior to use. A technique for determining bubble release pressure and other preferred characteristics for the diffusion elements used in the present invention are disclosed in the U.S. patent application of Lloyd Ewing and David T. Redmon, entitled "Diffusion Element", executed of even date herewith and filed in the U.S. Patent and Trademark Office simultaneously herewith, the entire disclosure of which is hereby incorporated herein by reference. It is also preferred to fabricate the element of hydrophilic materials, i.e. materials which are hydrophilic in the element as manufactured and prior to use. Also, preferably, the element is one whose sides, including for example extreme vertical edges and vertical or near vertical surfaces of steps near the periphery of the element, are porous, at least semi-permeable and free of adherent material preventing bubble emission. The preferred elements have a specific permeability when new of about 6 to about 200 SCFM at 2 inches of water gauge. One may choose a diffusion element having any one or all of the above preferred characteristics, it being understood however, that that portion of the volume of the element which is beneath the gas discharge surface will be free of through-holes other than pores.

The most preferred diffusion element is a ceramic plate of circular outline having a stepped edge, depicted in FIGS. 3 and 4, and includes circular central flat area 70, annular beveled edge 71, annular flat surface 72, outer annular beveled surface 73 and horizontal annular surface 74, whose respective outer diameters are 4.5, 6.5, 7.6, 8.7 and 9.25 inches respectively. Surface 70 lies 0.070 inch below surface 72. Beveled surface 73 is at an angle of inclination of 25° relative to the horizontal and its common edge with vertical side surface 75 has a 1/16th inch radius as viewed in transverse cross section. The respective overall heights of horizontal annular surface 74, the top edge of vertical side surface 75 and horizontal flat surface 72 are 0.5, 0.741 and 1.000 inch respectively.

The plate is formed from a mix containing particles of alumina with mean transverse and longitudinal dimensions of 0.020 and 0.032 inch respectively, and 20 parts by weight of ceramic bonding agent, per hundred parts by weight of alumina particles. The mix is compacted in a press having a ram with a planar surface and a cylindrical die cavity having a bottom wall with a shape corresponding to the upper surface of diffusion element 35.

The sides of the die cavity and the ram correspond in diameter with the peripheral edge 76 of diffusion element 35, the height of the die cavity from its bottom surface to its upper edge being 1.5 inches. The mix is poured into the cavity in excess, is struck off level with the top of the die and is compressed to the dimensions previously given under a pressure of approximately 900 psi. The resultant compact, after removal from the press, is fired in a kiln at a temperature sufficient to fuse the bonding agent and is then gradually cooled. The resultant product is a coherent porous ceramic diffusion element having a specific permeability of 25 SCFM ± 3 SCFM.

The diffusion element, whether of the above-described preferred type or not, is supported by and preferably nests within the plenum on the diffusion element supporting means. A sealing means is provided adjacent the periphery of the diffusion element for preventing leakage of air past the periphery of the element. Such sealing means may be fabricated from a wide variety of materials in a wide variety of forms. For example, one may employ various plastics and rubbery elastomers. The sealing means may be one or more members of circular, flat or other cross-section, including special profiles matched to the shape of the diffusion element and/or its supporting means. The requisite shapes can be produced by any suitable forming process, such as for instance extrusion, casting and other molding techniques.

The invention contemplates sealing means which are adherent or attached to the element, such as those which are clamped or bonded in place, and those which are not adherent or attached. Those sealing elements which are neither adherent nor attached to the diffusion elements, which are sealing elements are preferred in the present invention, are preferably held against the element by the structure of the plenum, by the structure of the retaining means described in greater detail below, by the structure of the diffusion element itself, and preferably by a combination of the foregoing. Disposition of the sealing means adjacent the periphery of the diffusion element includes placement inside or outside the outline of the periphery of the element as viewed in plan view and at varying elevations above, below or along the side of the element. However, the preferred position for the sealing means is at the upper edge of a vertical (including near vertical) side surface of the element as described in greater detail in connection with FIGS. 7 and 12.

In the preferred embodiment disclosed in FIGS. 3, 4 and 7 herein, a polyisoprene O-ring 80, having a Shore A Durometer hardness of about 40±3, nests in an annular step formed about the upper portion of the peripheral surface of diffusion element 35. The diameter of the cross section of O-ring 80 preferably slightly exceeds both the spacing between inner surface 29 of plenum side wall means 26 and opposed, facing vertical or near vertical side 75 of element 35, and the height of vertical or near vertical surface 75.

The retaining means employed in the invention can also take a wide variety of forms located at the periphery of the diffusion element for securing it to the plenum. Thus, the invention contemplates retaining means which secure the element by direct or indirect contact about its entire periphery or at spaced points about its periphery. This is in contrast to the center bolt arrangement shown for instance in U.S. Pat. No. 4,046,845 to Richard K. Veeder and No. 3,532,272 to Eric S. Branton.

Attachment of the diffusion element by central or other fasteners which extend through holes in the element, the boundaries of which lie within the active diffusion surface, produce detrimental effects, the prediction of which would not be obvious.

In much of the prior art, sealing between element and plenum is accomplished through vertically loaded elastomeric gaskets. The required loading to effect adequate seal of the porous diffusion element may be high, e.g. 50 pounds/lineal inch of seal. Greater strength and rigidity of the diffusion element and plenum is required to distribute these forces about the periphery than in the preferred embodiments of this invention wherein continuous peripheral clamping or retaining is employed.

Further, fasteners extending through the element into the plenum typically require holes with clearance. Unless the interiors of the holes are sealed in their entireties, free passage of air is provided in these clearances that promotes excessive flow from the diffusion element in the vicinity of the fastener. Enlarging the sealed area under the lower horizontal surface of the retaining means, to lengthen the path of air from the clearance zone to the diffuser surface does not correct this deficiency, since the reduction in unit flow (flux) in the vicinity of the fastener resulting from the additional sealed area at the surface, similarly reduces the frictional pressure drop in that region, and the problem of non uniform distribution persists.

The detrimental effects of the type fasteners above described may be overcome by the use of the peripheral clamping or retaining methods employed in our invention. Among the applicable retaining means are, for example, those including clips, clamps and rings which clamp or merely restrain, secured to the plenum by bolts, hooks, threads and other fastening means.

However, the preferred retaining means of the present invention shown in FIGS. 3, 4 and 7 is an internally threaded clamping ring 84 including a cylindrical member 85 having internal threads 86 matching external threads 31 on side wall means 28 of the plenum. Cylindrical member 85 has attached to it above the threads 86 a flange 88 which extends inwardly over generally upstanding wall 28 of the plenum and at least partly across the top of sealing means 80. According to a preferred embodiment the said flange 88 leaves the upper inner quadrant of the cross section of the O-ring 80 uncovered (shown in greater detail in FIG. 7) while clamping the O-ring with sufficient force to press it in tight engagement with at least the uppermost portion of vertical side portion 75 closely adjacent the edge 89 between side 75 and the upwardly facing adjacent surface 73, thereby avoiding formation of a crevice at the side of the diffusion element which would be in communication with the overlying water and could evacuate itself.

FIGS. 8 through 14 show alternative but less preferred embodiments of the combination of plenum, diffusion element, sealing means and retaining means which may nevertheless be used successfully in the invention. Each of these various embodiments has in common a plenum side wall means 26, annular horizontal shelf 27, and generally upstanding wall means 28 which is about of equal height with the diffusion element and which faces the opposed peripheral surface or surfaces of the diffusion element which is indicated by reference numerals 35 and 35A through 35G. For example, in FIG. 8, generally upstanding wall means 28 is provided with peripheral flange 90 and circumferentially spaced bolt holes 91 through which extend bolts 93 to clamp a plurality of circumferentially spaced clips 92 against the respective upper surfaces of flange 90 and diffusion element 35A. An elastomeric band or hoop member 95 serves as sealing means. For example, the hoop or band may have an unstretched inside diameter of about 85% of the outside diameter of diffusion element 35A, and is of slightly greater width than the vertical thickness of the diffusion element. When stretched and placed around diffusion element 35A, the extra width of the band forms an inturned upper edge 97, an inturned lower edge 98 and a cylindrical center portion 96, which respectively enclose the upper and lower edges 99 and 100 of the element. Inturned lower edge 98, bearing against annular horizontal shelf 27, seals the interior of the plenum from the vertical space between upstanding wall 28 and element 35A. Cylindrical portion 96 of the elastomeric band prevents air from passing peripherally out of diffusion element 35A into the crevice between itself and upstanding wall means 28. This is an example of retaining means which engages only the element and not the sealing means, and does not contact the entire periphery of the element.

The embodiment of FIG. 9 includes in its generally upstanding wall means 28 a second horizontal shelf 105 and, at the upper edge of said wall means, an outwardly extending generally horizontal flange 106. The peripheral edge of diffusion element 35B is provided with an impermeable coating 107 throughout the height of its peripheral surface, bears laterally against O-ring sealing means 80 which rests on shelf 105, and has an interference fit between diffusion element 35 and wall means 28. O-ring 80 is retained in place, i.e. prevented from upward movement, by a retaining ring 108 of cylindrical configuration having an inner surface 109 about which are situated a plurality of circumferentially spaced inwardly projecting lugs 110 which bear down at widely spaced points, with limited inward projection, on the upper surface of element 35B. Retaining ring 108 also includes an integral outwardly extending annular flange member 111 which rests upon and generally coincides with the outwardly extending flange 106 connected with wall means 28. These two flanges are held together by a split ring clamp 116 of generally C-shaped cross section having in transverse cross section limbs 112,113 with curved inner faces which engage similarly shaped annular detents 114,115 in the respective lower and upper surfaces of the flanges. The vertical flexability of limbs 112,113, and a radial split (not shown) in split ring clamp 116 enable the latter to act as a snap action clamp to hold flange 111 and its integral retaining ring 106 firmly together, while lugs 110 secure the diffusion element 35B in place and the lower surface of ring 108 does not clamp, but does prevent upward movement of O-ring 80.

The embodiment of FIG. 10 is similar in many respects to that shown in FIG. 9. The side of diffusion element 35C has an impermeable coating 107 and faces generally upstanding wall means 28. The latter, as in the previous embodiment, includes a second annular horizontal shelf 105 upon which rests O-ring 80, the latter being held in place by a retaining ring 108 with inner surface 109 and lugs 110. However, instead of the flange 106 previously described, upstanding wall 28 has an integral catch 120 formed about the entire periphery of its outer surface 121, and retaining ring 108 has a plurality of circumferentially spaced outwardly, downwardly and inwardly extending hooks 122 for engaging the catch 120, whereby ring 108 is held in place preventing upward movement of O-ring 80 and holding diffusion element 35C securely in place with lugs 110.

In FIG. 11, annular horizontal shelf 27 includes an inner upstanding lip 27A which helps retain in place a sealing means 125 of substantially rectangular cross section, upon which rests the marginal edge of the lower surface of diffusion element 35D. The side 127 or periphery of element 35D is in opposed, facing relationship with generally upstanding wall means 28 across a narrow vertical space or crevice 131. However side 127 is sealed off from crevice 131 by a substantially impermeable layer including an annular portion 126 above sealing means 125 and a peripheral edge portion 128 on the side of the element adjacent crevice 131. Element 35D is held firmly in place against sealing means 125 by internally threaded clamping ring 129 engaging threads 130 on the outer surface of wall means 28.

FIG. 12, like FIG. 7, is an example of a sealing means located at the edge between a side surface and an upwardly facing upper surface of the diffusion element. As shown in the FIG. 12, diffusion element 35E rests directly upon annular horizontal shelf 27 and has a substantially impermeable peripheral edge coating 128, which seals off the side of the element from the crevice 131 formed between the element and generally upstanding wall means 28. In this embodiment the sealing means 133 is of hybrid cross section, having a semi-circular outline in its upper portion and a rectangular outline in its lower portion. The semi-circular portion of sealing means 133 is engaged by the form fitting lower surface of annular flange 134 on internally threaded clamping ring 135, the latter engaging threads 136 formed on the outer surface of wall means 28. A short dependent lip 137 on the innermost edge of flange 134 tends to urge sealing means 133 outwardly and downwardly, so that the sealing means flat outer surface 139 and flat bottom surface 138 bear outwardly against the inner surface of wall means 28 and downwardly on diffusion element upper surface 140, and especially on the edge 141 at which upwardly facing surface 140 intersects with the element side surface 142.

FIGS. 7 and 12 both show the sealing means as a member of substantially lesser height than the height of the diffusion element which member is located at an edge at the intersection between the side of the diffusion element and an upwardly facing gas discharge surface thereof. The two embodiments show the sealing means below and adjacent said edge, or above and adjacent said edge; however, it is also possible to provide sealing means which covers a portion of the element both above and below the said edge. These various preferred configurations minimize the above described difficulties which occur with crevices that can be swept free of water and relieve adjacent portions of the element from the influence of surface tension, resulting in disturbance of the uniformity of distribution of air by the element. A particularly beneficial result is obtained when a sealing means at such an edge is used in combination with means for reducing the permeability of the side of the element, such as for instance, the band member 95 of FIG. 8 and the impermeable coatings 107 and 128 of FIGS. 9–12, or the stepped side configuration shown in FIG. 7. In the stepped configuration the particulate material of the diffusion element beneath horizontal annular surface 74 and adjacent peripheral surface 76 has been subjected to sufficient compression to reduce its permeability as compared to the upwardly facing gas discharge surfaces 72 and 73. The peripheral surfaces 76 may have merely a reduced permeability relative to the upwardly facing gas discharge surfaces, or may be rendered substantially impermeable. The property of reduced permeability relative to the upwardly facing gas discharge surfaces (including substantial non-permeability), is beneficial when combined with the sealing means at the above described edge. The combination tends to reduce both the crevice difficulties described above and difficulties with short circuiting of air from the plenum to the element gas discharge surface along air flow paths of differing length. For this reason, the combination of a side of reduced permeability and a sealing means at the above described edge represent a preferred embodiment of the present invention.

In FIG. 13, as in the preceding figure, the diffusion element 35F rests directly upon annular horizontal shelf 27. In this embodiment element 35F includes an annular recess 143 at the upper edge of its side 144. Side 144 as well as the lower and upper portions 145 and 146 of recess 143 are covered with a non-adherent cover or an impermeable coating 147. O-ring sealing means 80 rests in recess 143 and has an interference fit with impermeable coating 147 and the inner surface of wall means 28, while engaging the curved transitional surface 148 between the lower and upper surfaces 145 and 146. The O-ring seal 80 is clamped tightly in place by internally threaded sealing ring 149 engaging threads 150 in wall means 28, and consequently retains diffusion element 35F in place.

In the embodiment of FIG. 14 the side of diffusion element 35G includes a step generally indicated by 151 and including a generally horizontal annular surface 152 and vertical cylindrical surface 153, both of which are covered with a non-adherent cover or coated with impermeable coating 154. The remainder of the side of element 35G is a lower cylindrical surface 155 which need not necessarily have any impermeable coating thereon. O-ring seal 80 is compressed against four surfaces, including diffusion element surfaces 152 and 155, horizontal annular shelf 27 and the inner surface of wall means 28. Thus, inverted step 151 rests upon the O-ring 80 and is thereby indirectly supported by the diffusion element supporting means. An internally threaded clamping ring 156 engaging threads 157 on wall means 28 clamps the diffusion element in place. The annular flange 158 of clamping ring 156 has an inner surface 159 of about the same diameter as the diffusion element side surface 153. Lugs 160, situated at spaced points around the ring inner surface 159, extend a short distance inwardly over the upper surface of element 35G, holding it in place. Thus, the diffusion element 35G is clamped only at its periphery, and only at spaced positions along the periphery.

As shown in FIG. 15 side wall means 26 are affixed directly to the surface 16 of header pipe 11 so that surface 16 forms the lower wall of plenum 14.

Figure 16:
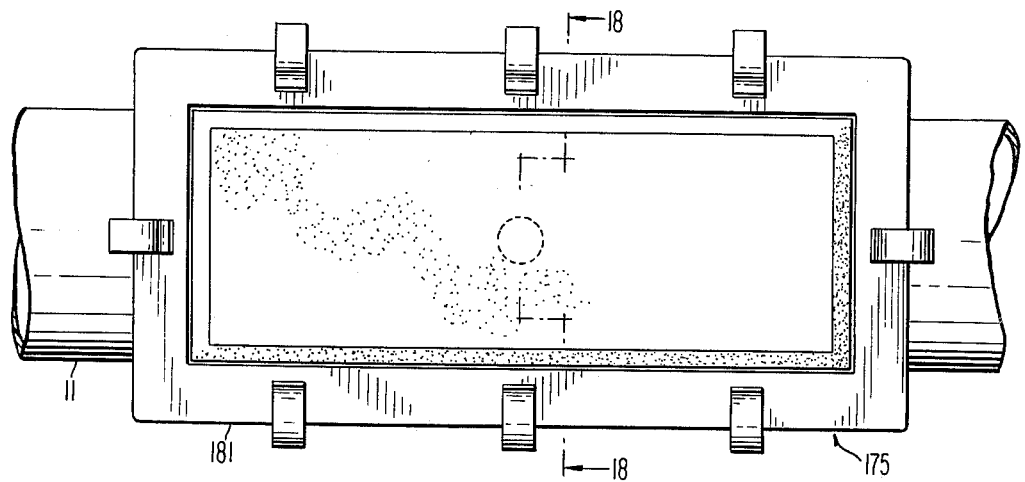
FIGS. 16 and 17 are plan and elevation views of a header pipe and diffuser wherein the diffuser has vertical side walls.
Figure 17:
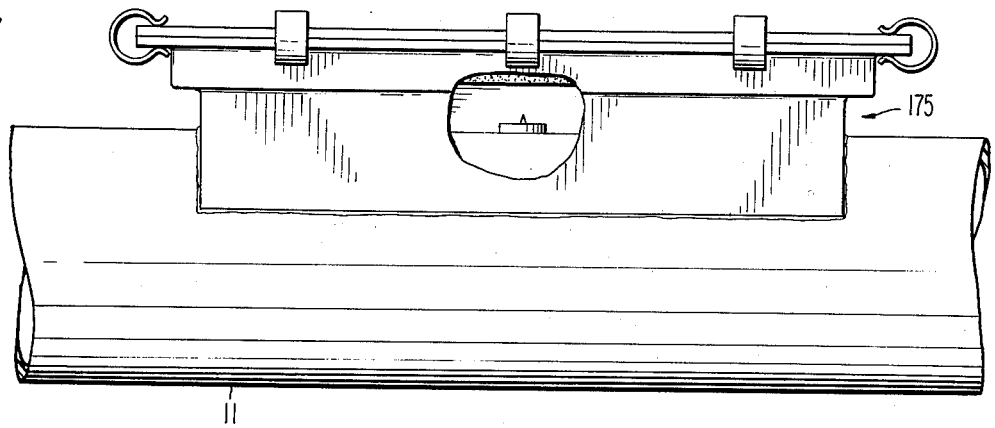
Figure 18:
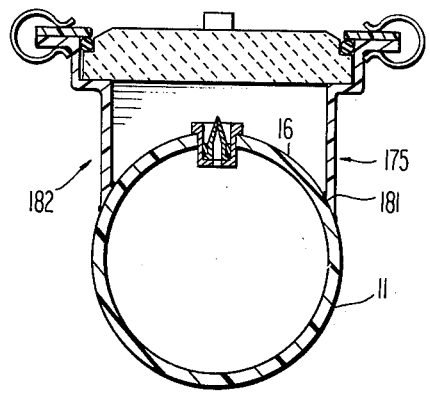
FIG. 18 is a vertical transverse cross section of header pipe and diffuser of FIG. 16 taken at section 18—18 of FIG. 16 showing a structure wherein the upper surface of the header pipe serves as the bottom wall of the plenum.

In the embodiment of FIGS. 16, 17 and 18, diffuser 175 is shown with vertical walls 181. FIG. 18 shows the vertical side walls bonded directly to surface 16 of header pipe 11 whereby surface 16 forms the lower wall of plenum 182. Although shown as rectangular, the walls could be curvilinear, including circular and elliptical, or irregular.

The invention as conceived has been illustrated herein in the context of the waste-water and sewage aeration art. However, experience with the invention has suggested that it can be applied to gas diffusion processes in general, including sewage treatment processes involving substantially pure oxygen, or oxygen- or ozone-enriched air, or non-sewage treatment processes involving a wide variety of gases and liquids.

The foregoing are but a few of the many ways in which the present invention may be embodied. The above embodiments are offered for purposes of illustration and not limitation. Accordingly, it is intended to protect all subject matter defined by the accompanying claims and all equivalents thereof.

What is claimed is:

1. A sewage aeration system comprising:
   a horizontally extending header pipe having an upper surface which is arcuate in transverse cross-section and having air outlet openings in said arcuate upper surface at spaced points along the length of said header pipe;
   a plurality of synthetic thermoplastic or thermoset resin plenums secured to said arcuate upper surface at spaced points along said header pipe in communication with said air outlet openings;
   said plenums having wall means, including side wall means extending transversely and longitudinally relative to said arcuate upper surface, and arcuate bottom wall means sealed in gas-tight relationship to said side wall means, said plenums further including diffusion element supporting means spaced upwardly from said header pipe on said side wall means;
   generally horizontal diffusion elements supported by said support means, said elements having air diffusion pores extending therethrough, but being free of through-holes other than air diffusion pores;
   retaining means engaging said diffusion elements about their peripheries for securing said elements to said plenums;
   sealing means adjacent the peripheries of the diffusion elements for preventing leakage of air from said plenums past the peripheries of said elements; and air flow regulator members in communication and connected with said air outlet openings and terminating beneath said diffusion elements for providing controlled flow of air from the interior of said header pipe to the interiors of said plenums beneath said diffusion elements.

2. The system of claim 1 wherein the side wall means has a lower edge conforming to and sealed in gas-tight relationship to said arcuate upper surface, whereby said upper arcuate surface of said header pipe comprises arcuate bottom wall means for said plenums.

3. The system of claim 1 wherein the wall means for said plenums further includes an arcuate bottom portion which conforms to and sealingly engages said arcuate upper surface of said header pipe.

4. The systems of claims 1, 2 or 3 wherein said side wall means are inclined upwardly and outwardly from said arcuate upper surface.

5. The system of claims 1, 2 or 3 wherein said side wall means extend substantially vertically upward from said arcuate upper surface.

6. The system of claim 1 wherein said diffusion elements have a bubble release pressure in the range of about 2 to about 20 inches of water gauge.

7. The system of claim 1 wherein said diffusion elements have vertical edges which are porous, permeable and free of adhered material preventing bubble emission and in which said vertical edges are covered by the combined structures of the plenums, sealing means and retaining means.

8. The system of claim 7 wherein the sealing means are located at or above common edges between generally upright peripheral surfaces and upwardly facing upper surfaces of the diffusion elements for preventing discharge of bubbles from below said edges.

9. The system of claim 1 wherein said plenums have outer walls positioned opposite generally upright edges of the diffusion elements, the outer surfaces of said outer walls having threads thereon, and said retaining means include ring means having corresponding internal threads for engaging the threads on said outer wall.

10. The system of claim 1 wherein all surfaces of the diffusion elements which emit bubbles have ready access to replacement water for maintaining the effect of surface tension upon said surfaces.

11. The system of claim 1 wherein said diffusion elements have central zones with an enhanced apparent volumetric compression ratio.

12. The system of claim 1 wherein said diffusion elements have boundary zones with an enhanced apparent volumetric compression ratio.

13. The system of claim 1 wherein said header pipe is a resin pipe.

14. The system of claim 13 wherein said resin pipe has a load bearing wall of polymeric material having a tensile strength of about 2000 to about 60,000 psi, a flexural modulus of about $4 \times 10^4$ to about $4 \times 10^6$ psi and a stiffness of about 10 to about 1000 psi by ASTM test D-2412.

15. The system of claim 1 wherein the plenums are bonded to the header pipe.

16. The system of claim 15 including adhesive bonds between the plenums and header pipe.

17. The system of claim 15 including welded bonds between the plenums and header pipe.

18. The system of claim 1 wherein said plenums and said header pipe are both of polymeric material and wherein the plenums are bonded to the header pipe.

19. The system of claim 18 wherein said plenums and said header pipe are both of polymeric material and include adhesive bonds between the plenums and header pipe.

20. The system of claim 18 wherein said plenums and said header pipe are both of polymeric material and include welded bonds between the plenums and header pipe.

21. The system of claim 1 wherein said plenums and header pipe are both of polymeric material and said plenums include lower wall means held in close fitting engagement with a substantial portion of the length of the header pipe outer surface and of the transverse cross section of the header pipe.

22. The system of claim 21 wherein said lower walls conform and engage with the transverse cross section of the header pipe through an arc of at least about 20°.

23. The system of claim 21 wherein said lower walls conform and engage with the transverse cross section of the header pipe through an arc of at least about 45°.

24. The system of claim 21 wherein said lower walls conform and engage with the transverse cross section of the header pipe through an arc of at least about 70°.

25. The system of claim 21 wherein said lower walls are of oval outline.

26. The system of claim 1 wherein said plenums include lower wall means held in close fitting engagement with a substantial portion of the length and transverse cross section of the header pipe, and wherein said header pipe, lower wall means and air flow regulator members form a combined bonded assembly.

27. The system of claim 1 wherein said plenums include lower wall means held in close fitting engagement with a substantial portion of the length and transverse cross section of the header pipe, and wherein said header pipe, lower wall means and sleeve members for mounting the air flow regulator members form a combined bonded assembly.

28. The system of claim 1 wherein the air flow regulator members do not retain the diffusion elements in place.

29. The system of claim 1 wherein the flow regulator members have uni-directional flow characteristics for discouraging backflow of liquid from the exterior of the diffuser through the diffusion elements into the plenums during loss of air pressure in said header pipe.

30. The system of claim 1 wherein the air flow regulator members, as viewed in a cross section extending transversely through the header pipe and plenums, is mounted within the outline of the header pipe.

31. The system of claim 1 wherein the air flow regulator members, as viewed in a cross section extending transversely through the header pipe and plenums, is mounted partly within the outline of the header pipe and partly within the outline of the plenums.

32. The system of claim 1 wherein the air flow regulator members, as viewed in a cross section extending transversely through the header pipe and plenums, is mounted within the outline of the plenum.

33. The system of claim 1 wherein the diffusion elements have upper gas discharge surfaces and generally upright sides which intersect to define upper edges, the sealing means are of lesser height than the diffusion elements, and the sealing means are positioned at said edges.

34. The system of claim 33 wherein the sealing means are in tight engagement with at least the uppermost portions of the sides of said diffusion elements.

35. The system of claim 1 wherein the diffusion elements are coherent compacts of finely divided particulate and/or fibrous material.

36. The system of claim 35 wherein said finely divided material includes one or more inorganic materials selected from the group consisting of alumina, silica, mullite and clays.

37. The system of claim 35 wherein said finely divided material includes fusible polymeric material.

38. The system of claim 35 wherein said particles and/or fibers are bound together by organic adhesive bonds, ceramic or fusion bonds or sintered portions of said particles and/or fibers.

39. The system of claim 1 wherein the diffusion elements are round as viewed in plan view.

40. The system of claim 1 wherein the diffusion elements have upper gas discharge surfaces and generally upright sides, and a step is formed in said sides adjacent said upper gas discharge surfaces for receiving said sealing means, whereby said step extends beneath said sealing means.

41. The system of claim 40 wherein the sealing means are of rubbery elastomeric material held in close fitting engagement with said step by said retaining means.

42. The system of claim 40 wherein the sealing means are neither adherent nor attached to the diffusion elements and are held in engagement with the steps adjacent the peripheries of the diffusion elements by portions of said plenums and of said retaining means.

43. The system of claim 42 wherein the upper inner quandrant of the cross sections of the sealing means are uncovered.

44. The system of claim 1 wherein the diffusion elements have a bubble release pressure of about 3 to about 15 inches of water gauge.

45. The system of claim 1 wherein the diffusion elements have a bubble release pressure of about 4 to about 10 inches of water gauge.

46. The system of claim 1 wherein the diffusion elements have a specific permeability when new in the range of about 6 to about 200 SCFM per inch of thickness at 2 inches of water gauge.

47. The system of claim 1 wherein said sealing means are of rubbery elastomeric material.

48. The system of claim 1 wherein the diffusion elements have no fastener holes extending through said elements within the boundaries of their active diffusion surfaces.

* * * * *

UNITED STATES PATENT AND TRADEMARK OFFICE
CERTIFICATE OF CORRECTION

PATENT NO. : 4,288,394
DATED : September 8, 1981
INVENTOR(S) : Lloyd Ewing, David T. Redmon, Paul M. Thayer It is certified that error appears in the above—identified patent and that said Letters Patent is hereby corrected as shown below:

Column 11, line 60, change "35" to -- 35B --.

Column 14, line 18, after "diffuser" insert -- holder --.

Signed and Sealed this

Sixth Day of April 1982

[SEAL]

Attest:

GERALD J. MOSSINGHOFF

*Attesting Officer*   *Commissioner of Patents and Trademarks*